2,990,394
STABILIZATION OF POLYMERS

William Forsyth Ainsworth, Ronald Barrie Wright, and Bernard Press, all of Norton-on-Tees, England, assignors to Imperial Chemical Industries Limited, London, England, a corporation of Great Britain
No Drawing. Filed July 6, 1959, Ser. No. 824,921
Claims priority, application Great Britain Aug. 1, 1959
7 Claims. (Cl. 260—45.8)

This invention relates to the stabilization of polymers.

It is well known to employ esters as plasticizers for organic polymers. Suitable esters are, for example, the phthalates of organic alcohols containing 8 or 9 carbon atoms. Thus, one ester which has found widespread use as a plasticizer is di-iso-octyl phthalate.

Polymers and copolymers, such as those of vinyl chloride, plasticized by phthalate esters are adversely affected by heat. For example, by being subjected for several hours to a temperature of, say, 150° C. they become dark in colour. As a means of retarding this undesirable deterioration, it has been proposed to include in the plasticizer a small amount of an anti-oxidant. It has been further disclosed that particularly suitable antioxidants are diphenylol propane and di-ortho-cresylol propane.

We have now found that results superior to those obtained when using either diphenylol propane or di-orthocresylol propane may be obtained by incorporating disalicylidene-ethylene diamine in addition to an anti-oxidant into the plasticized polymer.

Thus, according to the present invention, polymeric compositions having an improved stability are provided, the said compositions comprising a polymer, an ester-type plasticizer and minor proportions of disalicylidene-ethylene diamine and of an anti-oxidant.

Particularly advantageous compositions provided by the present invention are those in which the polymer is polyvinyl chloride.

Preferred plasticizers are the phthalates of 2-ethyl hexanol, the mixture of branched chain octanols known as iso-octanol, 3,5,5-trimethyl-hexanol, the branched chain alcohols containing 7 to 9 carbon atoms sold under the Registered Trade Mark "Alphanol," and produced by the so-called Oxo process, and the mixture of branched chain alcohols containing 10 carbon atoms known as iso-decanol.

Anti-oxidants for use in compositions provided by the present invention are, for example, the condensation product of acetone and diphenylamine, alkylated diphenylamines, such as a mixture of para-mono-tertiary octyl diphenylamine and para,para'-di-tertiary octyl diphenylamine, and polymerized 2,2,4-trimethyl-3,4-dihydroquinoline.

The amounts of constituents in the compositions of the present invention are suitably: 20 to 120 parts by weight of plasticizer per 100 parts of polymer, for example polyvinyl chloride, and 40 to 300 parts per million, based on the weight of plasticizer, of disalicylidene-ethylene diamine and of anti-oxidant, preferably equal parts of each being used. In particular, it is convenient to use 100 parts per million of disalicylidene-ethylene diamine and 100 parts per million of anti-oxidant, based on the weight of plasticizer.

The polymeric compositions provided by the present invention may be used for those purposes in which it is conventional to employ polyvinyl chloride. For example, they may be used in the form of sheets or as coverings for cables.

EXAMPLE 1

A polymeric composition was produced which contained:

| | Parts by weight |
|---|---|
| Polyvinyl chloride | 100 |
| Di-iso-octyl phthalate | 50 |
| Calcium stearate | 1 |
| Cadmium stearate | 1 |

This polymeric material was milled for 10 minutes at 150° C. and then moulded at a temperature of 160° C. and a pressure of 500 lbs. per square inch to a sheet having a thickness of 0.05 inch. This sheet was cut into small portions and maintained in an oven at a constant temperature of 150° C., the pieces being removed every 30 minutes. Tests were carried out using:

(a) No additive.
(b) 200 parts per million of diphenylol propane. (The quantity of additive given, like those given below, is based upon the amount of di-iso-octyl phthalate employed).
(c) 200 parts per million of di-ortho-cresylol propane.
(d) 200 parts per million of a condensation product derived from acetone and diphenylamine.
(e) 200 parts per million of disalicylidene-ethylene diamine.
(f) 100 parts per million of a condensation product derived from acetone and diphenylamine plus 100 parts per million of disalicylidene-ethylene diamine.

The results obtained are given in Table 1 below.

Table 1

| Additive | Conc.ⁿ (p.p.m.) | Period remaining clear and colourless (mins.) | Period to become dark brown (mins.) |
|---|---|---|---|
| Nil | | 60 | 150 |
| (b) | 200 | 150 | 300 |
| (c) | 200 | 210 | 450 |
| (d) | 200 | 150 | 380 |
| (e) | 200 | 90 | 270 |
| (f) | 100 / 100 | 390 | 450 |

Example 2

Example 1 was repeated using various plasticizers and anti-oxidents. In all cases the weight of plasticizer was 50% by weight of the amount of polyvinyl chloride. When an anti-oxidant but no disalicylidene-ethylene diamine was added, 200 parts per million, based on the weight of plasticizer, were employed. When both an anti-oxidant and disalicylidene-ethylene diamine were added, 100 parts per million of each, based on the weight of plasticizer, were employed. The results obtained are given in Table 2 below.

Table 2

| Additives | Plasticizer | Time in minutes | |
|---|---|---|---|
| | | Remaining clear | To turn dark brown |
| None | I | 90 | 300 |
| A+B | I | 420 | |
| None | II | 60 | 240 |
| A+B | II | 210 | 360 |
| None | III | 90 | 240 |
| A+B | III | 450 | |
| B | IV | 180 | 360 |
| A+C | IV | 450 | |
| D | IV | 150 | 360 |
| A+D | IV | 330 | |
| E | IV | 150 | 360 |
| A+E | IV | 330 | |
| None | V | 150 | 270 |
| A+E | V | 360 | 450 |

ADDITIVES

A = disalicylidene-ethylene diamine.
B = acetone-diphenylamine condensation product.
C = a liquid form of B.
D = polymerised 2,2,4-trimethyl-3,4-dihydroquinoline.
E = a solid mixture of para-mono-tertiary octyl diphenylamine and para,para'-di-tertiary octyl diphenylamine.

PLASTICISERS

These were all phthalates of:

I. 2-ethyl hexanol.
II. The mixture of branched chain alcohols containing 10 carbon atoms known as isodecanol.
III. Alcohols sold under the Registered Trade Mark "Alphanol."
IV. The mixture of branched chain octanols known as iso-octanol.
V. 3,5,5-trimethyl hexanol.

We claim:

1. In oxidation-stabilized polymer compositions which consist essentially of (1) a polymer comprising polyvinyl chloride; (2) as plasticizer, a dialkyl ester of an organic dicarboxylic acid; and (3) an antioxidant of the class consisting of (a) the condensation product of acetone and diphenylamine, (b) polymerized 2,2,4-trimethyl-3,4-dihydroquinoline, and (c) alkylated diphenylamines; the improvement consisting in the additional presence of a minor amount of disalicylidene-ethylene diamine.

2. Compositions as claimed in claim 1 in which the polymer is polyvinyl chloride.

3. Compositions as claimed in claim 1 in which the plasticizer is the phthalate of an alcohol selected from the group consisting of: 2-ethyl hexanol, the mixture of branched chain octanols known as iso-octanol, 3,5,5-trimethyl-hexanol, the branched chain alcohols containing 7 to 9 carbon atoms produced by the so-called Oxo process, and the mixture of branched chain alcohols containing 10 carbon atoms known as isodecanol.

4. Compositions as claimed in claim 3 containing 20 to 120 parts by weight of plasticizer per 100 parts by weight of polymer.

5. Compositions as claimed in claim 1 in which the anti-oxidant is a mixture of para-mono-tertiary octyl diphenylamine and para, para'-di-tertiary octyl diphenylamine.

6. Compositions as claimed in claim 1 in which there is present 40 to 300 parts per million each of disalicylidene-ethylene diamine and of anti-oxidant based on the weight of plasticizer.

7. Compositions as claimed in claim 6 in which there is present 100 parts per million each of disalicylidene-ethylene diamine and of anti-oxidant based on the weight of plasticizer.

References Cited in the file of this patent
UNITED STATES PATENTS 2,732,366    Tubbs et al.            Jan. 24, 1956